Jan. 8, 1952 F. GIENGER 2,581,648
SILENT PAWL AND RATCHET
Filed Oct. 1, 1949
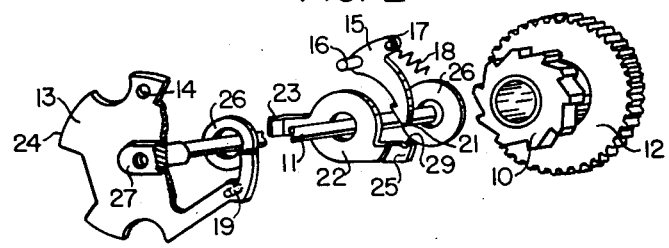
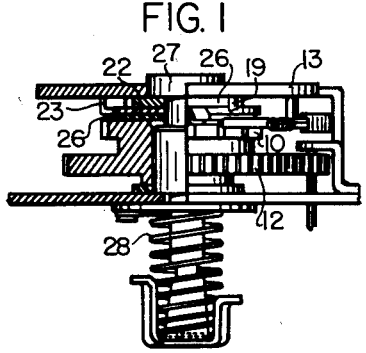
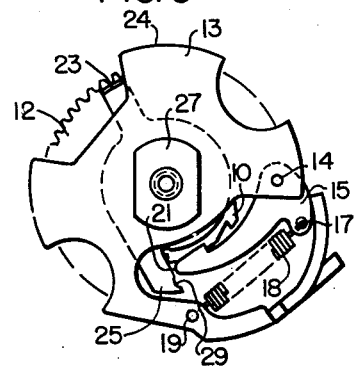
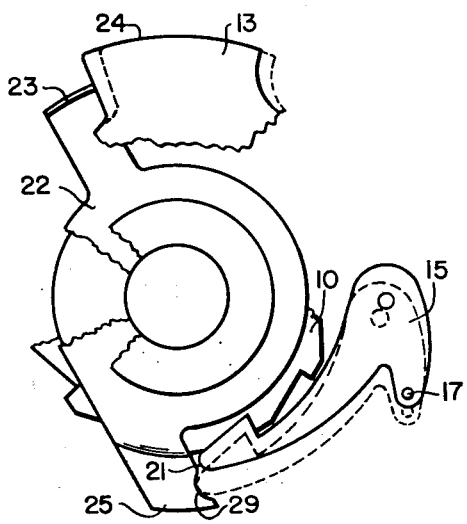
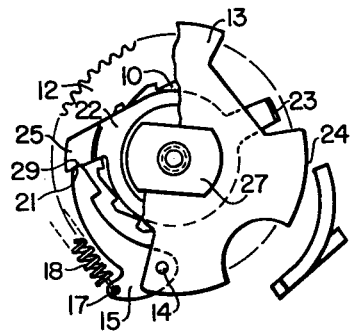
INVENTOR.
FRED GIENGER
BY
*Chas. W. Candy*
ATTORNEY Patented Jan. 8, 1952

2,581,648

UNITED STATES PATENT OFFICE 2,581,648

SILENT PAWL AND RATCHET

Fred Gienger, Highland Park, Ill., assignor to Automatic Electric Laboratories, Inc., Chicago, Ill., a corporation of Delaware Application October 1, 1949, Serial No. 119,156

6 Claims. (Cl. 74—576)

This invention relates to a silent pawl and ratchet mechanism and more particularly to such a mechanism in which maximum leverage upon the pawl insures quiet operation during the forward stroke thereof.

It is an object of the invention to provide a pawl and ratchet mechanism in which the clicks normally present during the forward stroke of the pawl are eliminated.

Another object of the invention is to provide a pawl and ratchet mechanism containing a friction element to engage the pawl during its forward stroke to maintain it out of engagement with the teeth of the ratchet wheel.

A further object is to provide a silent pawl and ratchet mechanism in which the pawl has a rounded peripheral surface at the detent end thereof which is engaged by a projecting portion of a friction member during the forward stroke of said pawl.

A feature of the invention is the use of the pawl itself in order to provide the greatest possible leverage in maintaining the pawl out of engagement with the ratchet teeth during the forward stroke of the pawl.

Other objects and features will become apparent from a perusal of the drawing in connection with the following detailed explanation.

The drawing illustrates a single embodiment of the invention. Figure 1 is a partially cross sectional vertical view of a mechanism including this invention and shows particularly an application of the invention to a telephone dial;

Figure 2 is an exploded perspective view partially in cross section showing a ratchet wheel, pawl, pawl mounting means and friction element, together with a pair of washers, in accordance with this invention;

Figure 3 is a top plan view of the parts of Figure 2 assembled on a shaft;

Figure 4 is a view similar to Figure 3 except that the friction element has engaged the pawl during its forward stroke and is holding it out of engagement with the ratchet wheel;

Figure 5 is an enlarged broken view of the ratchet, friction member and pawl with the pawl shown in dotted lines during the forward stroke and in heavy lines during the return stroke.

Referring to the drawing, a ratchet wheel 10 is mounted upon a shaft 11. The ratchet 10 may be concentric with an integral gear 12 which may be used to drive other gears. Normally the gear 12 will have a catch mechanism to limit its rotation to the direction conforming to the rotation of the ratchet 10.

Also mounted upon the shaft 11 is a pawl mounting element 13 which has an aperture 14 to which a pawl 15 is attached by a pivot pin 16. An aperture 17 in the pawl 15 has a tension spring 18 fastened therethrough. The spring 18 is fastened at its other end through an aperture 19 in the pawl mounting member 13. Since the pawl 15 has free rotation around the pivot 16 the spring 18 serves to force the detent end of the pawl inward toward the axis of shaft 11. It is to be noted that the detent end of pawl 15 has a rounded peripheral surface 21. In the embodiment shown pawl mounting 13 is integral with shaft 11 while ratchet 10 is free to rotate in one direction on shaft 11. The device would also operate satisfactorily if ratchet 10 were integral with shaft 11 and pawl mounting 13 free to rotate thereon.

Located between ratchet 10 and pawl mounting member 13 is a friction element 22. In the assembled device the friction element 22 is compressed sufficiently between ratchet 10 and pawl mounting 13 to exert a slight drag when the pawl and ratchet are rotated relative to one another. Friction element 22 has a projecting portion 23 which engages a projecting portion 24 of pawl mounting 13 during the return stroke of the pawl. Friction element 22 has an additional projecting portion 25 which engages surface 21 of pawl 15 during the forward stroke of the pawl. Projection 23 of friction element 22 is bent over at the tip in order to provide a surface for engaging projection 24 of pawl mounting 13. Projection 25 of friction element 22 is in a plane displaced slightly from the plane of the main portion of the element in order that the peripheral surface of projection 25 may engage the surface 21 of pawl 15. The peripheral surface 29 of projection 25 is extended or spiraled outward from pivot 16 of pawl 15 in order to exert an outward force on surface 21 of pawl 15. The pressure on friction member 22 is increased to a point where this outward pressure is sufficient to overcome the bias of spring 18 and force pawl 15 out of engagement with ratchet 10 during its forward stroke.

A pair of washers 26 (Figs. 1 and 2) aid in maintaining proper pressure of friction element 22. This pressure may be adjusted by an adjusting screw 27 (Figs. 1, 3 and 4).

A spring 28 shown in Figure 1 may be placed under tension during the forward stroke of pawl 15 in order to provide energy for the return stroke of pawl 15.

When the device is at rest at the end of a return stroke of pawl 15 the members are in the position shown in Figure 3 with pawl 15 in engagement with ratch 10. When pawl mounting 13 is rotated around shaft 11 friction member 22 lags behind pawl mounting 13 until surface 29 of projection 25 engages surface 21 of pawl 15. Since surface 29 is spiraled outward a force is applied to surface 21 to overcome the bias of spring 18 and force the detent end of pawl 15 a slight distance around pivot 16 thereby maintaining pawl 15 out of engagement with ratchet 10 during its entire forward stroke.

At the conclusion of the forward stroke of pawl 15 spring 28 applies a return rotation to pawl mounting 13. Friction member 22 lags behind pawl mounting 22 until projection 23 of friction member 22 engages projection 24 of pawl mounting 13. Since friction member 22 lags behind pawl mounting 13, surface 29 of friction member 22 goes out of engagement with surface 21 of pawl 15 and spring 18 then pivots pawl 15 into engagement with ratchet 10, thereby rotating gear 12 during the return stroke of pawl 15.

The projections of friction element 22 and pawl mounting 13 are constructed to leave only a very slight lag between these members during operation of the device.

While the invention has been described with reference to a single embodiment it is obvious that many modifications may be made without departing from the spirit of the invention and it is not the intention to limit the scope thereof other than as necessitated by the appended claims.

I claim as my invention:

1. A pawl and ratchet mechanism comprising a ratchet wheel, means for mounting said ratchet wheel, a pawl adapted to cooperate with said ratchet wheel, means for pivotally mounting said pawl to engage said ratchet wheel, the portion of the detent end of said pawl which is farthest removed from said pivot means having a rounded peripheral surface, a friction element between said ratchet wheel and said pawl mounting means, and a projection on said friction element extending outwardly therefrom and disposed to engage the said rounded surface of the detent end of said pawl, said projection having the pawl engaging surface extending outward with reference to the pawl mounting pivot, whereby the pressure of said friction element surface against said rounded peripheral pawl surface forces said pawl out of engagement with said ratchet wheel when said pawl is rotated with reference to said ratchet wheel.

2. A pawl and ratchet mechanism comprising a ratchet wheel, means for mounting said ratchet wheel, a pawl adapted to cooperate with said ratchet wheel, means for pivotally mounting said pawl in a position where it is engageable with said ratchet wheel, a friction element between said pawl mounting means and said ratchet wheel, the portion of the detent end of said pawl which is farthest removed from said pivot means having a rounded peripheral surface, said friction element offering resistance to rotational movement when said pawl mounting means is rotated with reference to said ratchet wheel, and a projection on said friction element extending outwardly therefrom and disposed to engage the said rounded surface of the detent end of said pawl, said projection having the pawl-engaging surface extending outward with reference to the pawl mounting pivot whereby the pressure of said friction element surface against rounded said pawl forces said pawl out of engagement with said ratchet wheel when said pawl is rotated with reference to said ratchet wheel.

3. A silent pawl and ratchet mechanism comprising a shaft, a ratchet wheel rotatable in one direction on said shaft, a pawl mounting member rigidly attached to said shaft adjacent said ratchet wheel, a pawl pivotally attached to said pawl mounting member and disposed to cooperate with said ratchet wheel, a spring between said pawl and said pawl mounting member to hold said pawl in engaged position relative to said ratchet wheel, a friction element mounted on said shaft and rotatable between said ratchet wheel and said pawl mounting member, a first projection on said pawl mounting member, a second projection on said friction element disposed to engage said first projection during the return stroke of said pawl, and a third projection on said friction element disposed to contact the outer surface of the detent end of said pawl, said third projection having the pawl engaging surface spiraled outward with reference to the pawl mounting pivot whereby the pressure of said spiral surface against said pawl overcomes the bias of said spring and maintains said pawl out of engagement with said ratchet wheel when said pawl is forwardly rotated with reference to said ratchet wheel, said first projection engaging said second projection during the return stroke of said pawl to maintain said third projection in a position engageable by said pawl during any subsequent forward stroke thereof.

4. A pawl and ratchet mechanism comprising a ratchet wheel, means for mounting said ratchet wheel, a pawl adapted to cooperate with said ratchet wheel, means for pivotally mounting said pawl in a position where it is engageable with said ratchet wheel, the portion of the detent end of said pawl which is farthest removed from said pivot means having a rounded peripheral surface, a friction element between said pawl mounting means and said ratchet wheel, said friction element offering resistance to rotational movement when said mounting means is rotated with reference to said ratchet wheel, a pawl engaging projection extending outward from said friction element and disposed to engage the said rounded peripheral surface of the detent end of said pawl during forward rotational movement of said pawl, said projection having the pawl engaging surface spiraled outward with reference to the pawl mounting pivot whereby the pressure of said spiral surface against said rounded pawl surface forces said pawl out of engagement with said ratchet wheel when said pawl is rotated in a forward direction with reference to said ratchet wheel, coacting projections extending outward from said pawl mounting means and said friction element, said coacting projections being engageable during the return stroke of said pawl to maintain said pawl engaging projection in a position engageable by said rounded pawl surface during any subsequent forward stroke of said pawl, said coacting projections being out of engagement during the forward stroke of said pawl.

5. A pawl and ratchet mechanism comprising a ratchet wheel, means for mounting said ratchet wheel, a pawl adapted to lie in the same plane as and to cooperate with said ratchet wheel, means constantly biasing said pawl toward engagement with said ratchet wheel, means for pivotally mounting said pawl in a position where it is engageable with said ratchet wheel, the portion of the detent end of said pawl which is farthest removed from said pivot means having a rounded peripheral surface, a friction element between said pawl mounting means and said ratchet wheel, and a projection on said friction element disposed to engage the said rounded surface of the detent end of said pawl, said friction element having the pawl engaging surface extending outward with reference to the pawl mounting pivot and lying in the same plane as said pawl and said ratchet wheel, said friction element offering resistance to rotational movement when said pawl mounting means is rotated forwardly with reference to said ratchet wheel, whereby said pawl engaging surface contacts said rounded pawl surface and overcomes said pawl biasing means to force said pawl out of engagement with said ratchet wheel.

6. A pawl and ratchet mechanism comprising a shaft and a pawl, a ratchet wheel rotatable in one direction on said shaft, a pawl mounting member rigidly attached to said shaft adjacent said ratchet wheel, means for pivotally attaching said pawl to said pawl mounting member, said pawl being disposed to lie in the same plane as and to cooperate with said ratchet wheel, means constantly biasing said pawl toward engagement with said ratchet wheel, the portion of the detent end of said pawl which is farthest removed from said pivot means having a rounded peripheral surface, a friction element between said pawl mounting member and said ratchet wheel, a projection on said friction element disposed to engage the said rounded surface of the detent end of said pawl, said projection having the pawl engaging surface extending outward with reference to said pawl mounting pivot means and lying in the same plane as said pawl and ratchet wheel, said friction element offering resistance to rotational movement when said pawl mounting member is rotated with reference to said ratchet wheel, whereby the pressure of said friction element surface against said rounded pawl surface overcomes said pawl biasing means and forces said pawl out of engagement with said ratchet wheel when said pawl is forwardly rotated with reference to said ratchet wheel, the said resistance of said friction element to rotational movement causing said pawl and said friction element to become disengaged during the return stroke of said pawl, and coacting projections extending outward from said pawl mounting member and said friction element, said coacting projections being engageable during the return stroke of said pawl to maintain said pawl engaging projection in a position engageable by said rounded pawl surface during any subsequent forward stroke of said pawl, said coacting projections being out of engagement during the forward stroke of said pawl.

FRED GIENGER.

REFERENCES CITED

The following references are of record in the file of this patent:

UNITED STATES PATENTS

| Number | Name | Date |
| --- | --- | --- |
| 82,935 | Garfield | Oct. 13, 1868 |
| 164,414 | Barnes | June 15, 1875 |
| 357,691 | Rice | Feb. 15, 1887 |
| 787,392 | Norris | Apr. 18, 1905 |
| 863,591 | Coy | Aug. 20, 1905 |
| 1,400,068 | Hunt | Dec. 13, 1921 |
| 2,389,695 | Stenhammer | Nov. 27, 1945 |